Patented Mar. 22, 1949

2,464,783

UNITED STATES PATENT OFFICE 2,464,783

RUBBER COATED RESIN SATURATED SHEET AND PROCESS OF MAKING THE SAME

Edward R. Dillehay, Glen Ellyn, Ill., assignor to The Richardson Company, Lockland, Ohio, a corporation of Ohio No Drawing. Application February 28, 1945, Serial No. 580,266

3 Claims. (Cl. 117—80)

It has been proposed for certain uses to provide a material which may be needed in quite thin sheets, which consists of a fabric saturated with phenolic resin on the surfaces of which is a bonded lamination of synthetic rubber, thus contributing a compressible surface which is at the same time resistant to acid. While it would be practical perhaps to laminate a synthetic rubber sheet to a cured phenolic resin sheet, the thinness of the rubber would be a practical limitation.

It is the object of my invention to provide such a sheet in which the rubber material is bonded thereto, but in which the rubber material is sprayed or coated on the dried resin saturated sheet, and the product given a cure, as to which both polymerizable substances have been arranged to take the same curing cycle. In this way I am not limited in thinness either as to the phenolic resin base nor the rubber composition thereon, and I find that the bond of the rubber is very strong.

As a fabric base for my product, I may use a thin fiber glass woven sheet, but in practice I have used sheets of unbleached print cloth. A preferred one for the thinnest structure is 80×80 thread count cloth.

The resin that is selected is a phenol formaldehyde condensation product which has a short curing cycle at fairly low temperature. There is a wide range of composition which will serve this purpose, and it is well within the skill of the plastics art to select one. The curing cycle of the rubber is controlled to equalize it with the phenol resin by selection of the curing agents and retarders. I have used a phenol resin which will cure at 300 degrees F. between steel plates under 1000 pounds pressure in ten minutes. This is not, however, a limitation of my invention.

Having saturated the fiber sheet, I then permit it to dry to its semi-cured state. It is then ready for the application of the synthetic rubber.

This rubber is applied when in the form and consistency of a cement in a suitable solvent which does not attack the resin, either by spraying or by applying it to a roll equipped with a doctor, which roll applies the cement to the sheet. By spraying I have produced a rubber bonded surface film, complete and without uncoated patches or spots, having a thickness of .002 in. I have used a fiber sheet having a thickness when finished of around .01 in. These dimensions of resin saturated sheet and rubber can, of course, be varied.

I will give two examples of a rubber cement for application to the sheet. In the first example, in which the highest acid resistance is not required, I have used neoprene (GRM i. e. Government Standard) together with an anti-oxidant, a cure retarder, a filler, a plasticizer to facilitate compounding on the rubber mill, and curing agents.

A compound which will cure at the same rate above noted for a resin has been employed which contains neoprene 100 lbs., Neozone (anti-oxidant) 2 lbs., sodium acetate (a cure retarder) 1 lb., Furnex (a filler of carbon black which functions in rubber work as a reinforcing agent as well) 40 lbs., zinc oxide 5 lbs., magnesium oxide 4 lbs. (these last two being curing agents), and Circo process oil (a petrolatum product used as a lubricant for facilitating mixing on the rubber mill) 20 lbs.

This mixture is first compounded on a rubber mill and then dissolved down in a suitable solvent, such as benzol, the benzol being around 75% of the solution. The texture of the solution will be like a rubber cement, and capable of spraying with a spray gun, or flowing onto a roll having a doctor.

Where a higher acid resistance is needed, for example, a rubber which will resist concentrated sulphuric acid for five minutes without attack, I employ a special resin compound along with the rubber which serves to add markedly to the natural acid resistance of the neoprene.

The resin which I employ is one made from furfuryl alcohol in the presence of a small amount of sulphur as a catalyst. The amount of sulphur will be from .1% to .01%. A small amount of distilled water is used, being added to the sulphur and furfuryl alcohol and the material is reacted either in a reflux condenser at room temperature or preferably under a pressure of about 50 lbs. gauge, until the material is polymerized and a thick, black resinous material is formed. Vacuum distillation or cooling and decanting will remove the water. The resin acts like thick rubber in consistency and works somewhat like crude rubber on a mixing mill.

A formula used with success employing this acid resistant resin is neoprene rubber (GRM Government Standard) 95 pounds, sodium acetate 1 lb., Neozone 2 lbs., extra light magnesium oxide 4 lbs., zinc oxide 5 lbs., Circo process oil 20 lbs., all for the reasons set forth in connection with the first example. Added to the formula is the special resin 20 lbs., petrolatum 3 lbs., and synthetic butadiene-styrene rubber (GRS Government Standard) 5 lbs., these last two ingredients being for the purpose of plasticizing the resin for best working on the rubber mill.

Also, I employ stearic acid 4 lbs., because the special resin does not cure up rapidly except where acid conditions are present and since it serves also as a lubricant to facilitate working on the rubber mill.

As in the first instance, this compound is brought together on the rubber mill and there follows the making of the cement-like solutions again on a 25%-75% basis.

In these examples, if the neoprene is used in the latex condition, the natural solvent present may not have to be reinforced by the benzol. The curing agents for the neoprene are simply the ones used in standard practice for neoprene rubber, but are selected as to amount together with the retarder to give the same curing cycle as the selected resin. Hence, other curing agents and retarders are within the scope of my invention which is not concerned with the particular ones used, but in the proportion of them. A curing test as a routine matter in the selection of the curing agent and retarder formula is well within the skill of the rubber compounder.

It is well within the possibilities in this rapidly developing art that a highly acid resistant polymerizable compound, other than the highly acid resistant resin described, may be discovered, which can be brought down in curing time and rendered sufficiently plastic to work in with the rubber. Since the invention in this respect is based on the behavior of the furfuryl alcohol resin, some of the ensuing claims call for the resin in general terms. Others call for the particular resin.

The particular lubricants can be varied to suit the taste of the rubber compounder and again do not constitute the point of my invention. Others could well be substituted.

It is believed that by giving examples of the rubber compound employed, and stating the purpose and function of the materials, I have sufficiently instructed the rubber compounder in the selection of equivalent formulae to serve the same purpose. The curing time and the consistency during application so as to obtain a film of controlled thinness or thickness, the preliminary saturation and drying to semi-cure of the resin saturated fiber sheet with the effect of a surprisingly strong bond of the rubber and a laminated product made in situ in a single cure, are the principal novel features involved.

In the curing I have indicated a curing time of ten minutes between steel plates on a single thickness sheet at 300° F. and 1000 pounds pressure. However, where a number of sheets are to be cured at one time, the cycle will be longer, and the temperature applied will be higher. A practice satisfactorily used with the two formulae now disclosed is to lay the sheets between layers of cellophane, in piles of a considerable number of layers, and place the bundle in the press, applying the pressure of 1000 pounds and applying heat at 350° F. Heat insulation at the top and bottom of the pile will tend to prevent over cure of the outer layers and supply the whole mass with about the same heat. In such a practice, the materials have been cured in a period of 60 to 90 minutes, applied temperature 350° F., and the material left in the press after turning off the steam for a cooling cycle of 30 minutes. Twenty sheets or more at a time can be cured at once in this practice, which is a large economy in manufacturing effort.

Having thus described my invention, what I claim as new and desire to secure by Letters Patent is:

1. The method of forming a rubber coated phenolic resin sheet which consists in saturating a fabric with the phenolic resin capable of curing at low temperature, drying the saturated sheet, preparing a rubber cement in a solvent inactive with respect to the resin comprising neoprene rubber, curing agents of metallic oxides in proportion of around ten per cent to the weight of the neoprene, and a lesser per cent of a cure retarder, together with a carbon black filler, applying the cement in a thin layer to the dried resin sheet, and then after drying the solvent from the rubber, curing the sheet under heat and pressure, of around 300° F. at 1000 pounds as applied to the sheets.

2. A new sheeted product consisting of a cured phenolic resin saturated sheet of woven fiber and bonded with the surface thereof a cured-in-place film of neoprene rubber, together with a lesser proportion of a resin formed of polymerized furfuryl alcohol.

3. The method of forming a rubber coated phenolic resin sheet which consists in saturating a fabric with a phenolic resin capable of curing at a low temperature, drying the saturated sheet, imposing thereon in a suitable solvent inactive with respect to the dried resin, a coating of uncured neoprene together with a curing agent and a cure control material, whereby the curing temperature and time of the rubber equals that of the resin saturant, to which is added a polymerized furfuryl alcohol and in which plasticizers and an acid agent are added to make the resin workable in compounding, and after the solvent of the rubber composition has been dried, curing the product under pressure and temperature to cure both the resin saturant and the rubber coating.

EDWARD R. DILLEHAY.

REFERENCES CITED

The following references are of record in the file of this patent:

UNITED STATES PATENTS

| Number | Name | Date |
|---|---|---|
| 1,776,879 | Baekeland | Sept. 30, 1930 |
| 1,967,863 | Collins et al. | July 24, 1934 |
| 2,128,229 | Charch et al. | Aug. 30, 1938 |
| 2,334,526 | Allison | Nov. 16, 1943 |
| 2,368,426 | Root et al. | Jan. 30, 1945 |
| 2,372,048 | Auxier | Mar. 20, 1945 |

OTHER REFERENCES

Marchionna's "Butalastic Polymers," Reinhold Pub. Corp., New York, 1946, pp. 452–455.